(12) United States Patent
Martin et al.

(10) Patent No.: US 8,880,662 B1
(45) Date of Patent: Nov. 4, 2014

(54) RE-PROVISIONING A NETWORK DEVICE

(75) Inventors: Geoffrey Scott Martin, Overland Park, KS (US); Michael Philip Dougan, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 90 days.

(21) Appl. No.: 13/195,074

(22) Filed: Aug. 1, 2011

(51) Int. Cl.
*G06F 15/177* (2006.01)

(52) U.S. Cl.
USPC .......................................... 709/221; 709/228

(58) Field of Classification Search
None
See application file for complete search history.

(56) References Cited

U.S. PATENT DOCUMENTS

| | | | | |
|---|---|---|---|---|
| 7,610,014 | B2 * | 10/2009 | Buckley | 455/41.2 |
| 2006/0073788 | A1 * | 4/2006 | Halkka et al. | 455/41.2 |
| 2009/0054068 | A1 | 2/2009 | Halkka | |
| 2009/0063689 | A1 * | 3/2009 | Camille et al. | 709/227 |
| 2009/0093248 | A1 | 4/2009 | Srinivasan | |
| 2009/0098855 | A1 * | 4/2009 | Fernandez et al. | 455/410 |
| 2009/0156209 | A1 * | 6/2009 | Franklin et al. | 455/435.2 |
| 2010/0223098 | A1 * | 9/2010 | Hjelm et al. | 705/10 |

FOREIGN PATENT DOCUMENTS

WO    WO 2009/092115 A2 *    7/2009

OTHER PUBLICATIONS

Wi-Fi Cellular Switching : VoIP cell phone roams between signals from GSM/GPRS or CDMA towers and short-range wireless broadband networks. Posted Sep. 26, 2005.

* cited by examiner

*Primary Examiner* — Farid Homayounmehr
*Assistant Examiner* — Maung Lwin

(57) ABSTRACT

Methods, media, and network devices are provided for automatically re-provisioning a network device. The network devices include several triggers for re-provisioning the network device. When a trigger is satisfied, the network devices may switch communication networks by replacing current provisioning credentials with provisioning credentials for other communication networks. After the switch, the home address for the network devices point to the other communication networks.

18 Claims, 4 Drawing Sheets

US 8,880,662 B1

RE-PROVISIONING A NETWORK DEVICE

SUMMARY

A high-level overview of various aspects of the embodiments of the invention are provided here for that reason, to provide an overview of the patent, and to introduce a selection of concepts that are further described below in the detailed-description section. This summary is not intended to identify key features or essential features of the claimed subject matter, nor is it intended to be used as an aid in isolation to determine the scope of the claimed subject matter.

In brief, and at a high level, this patent describes, among other things, methods, systems, servers, and computer-readable media for automatically re-provisioning a network device. The network device receives notifications when one or more triggers are satisfied. In turn, a machine-to-machine (M2M) component selects credentials for another communication network that is associated with the satisfied trigger. The other communication network may be a wireless network from a different carrier. In certain aspects, the network device switches connection to the communication network associated with the selected credentials.

Accordingly, the network device leverages a combination of logic executed by a provisioning management system and logic executed on a M2M component of the network device. The logic executed by the network device and provision management system automatically redirects the network device to various communication networks. The network device is redirected to the various communication networks based on triggers. The triggers include, but are not limited to, location, time of day, day of week, data transmission speeds, network device velocity, etc.

BRIEF DESCRIPTION OF THE SEVERAL VIEWS OF THE DRAWINGS

Illustrative embodiments of the invention are described in detail below with reference to the attached drawing figures, wherein.

DETAILED DESCRIPTION

Figure 1:
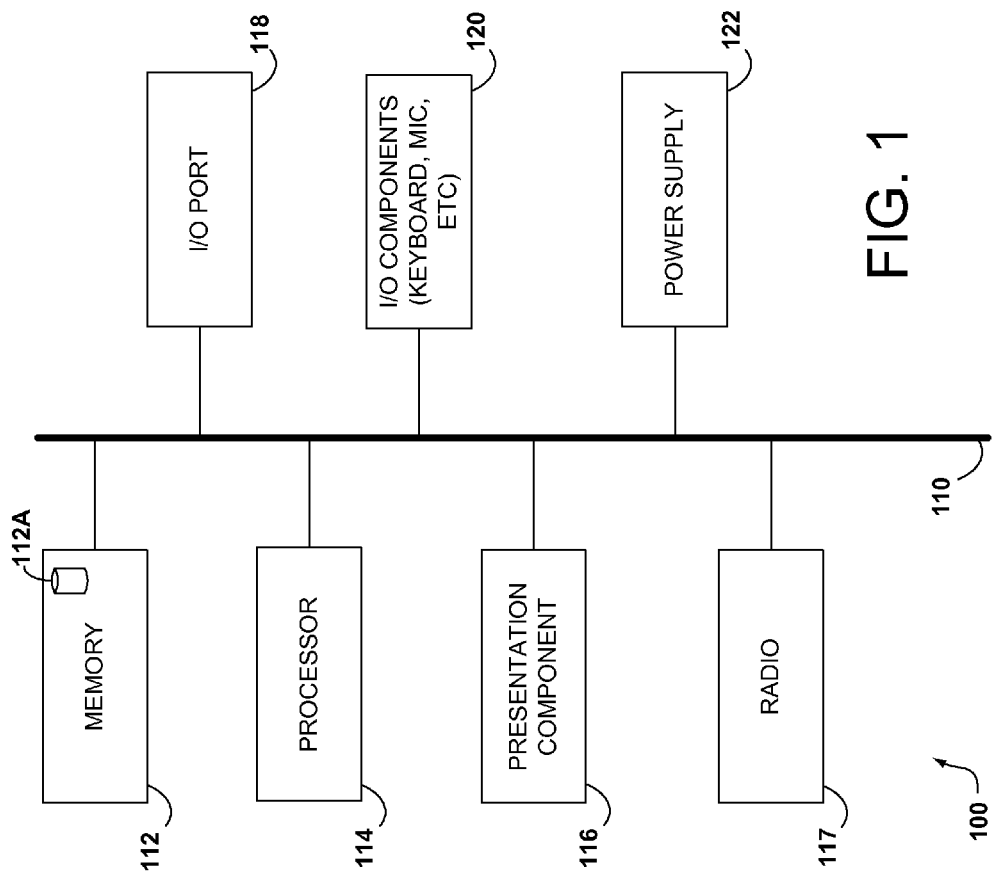
FIG. 1 depicts an illustrative network device suitable for use in connection with embodiments of the invention.

The subject matter of the invention is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Embodiments of the invention are directed to network devices configured with M2M components. The network devices may include smart meters, home appliances, washers, dryers, consumer electronics, vending machines, vehicle tracking devices, digital books, image and video recorders, etc. The M2M component provides the network devices with access to several communication networks, including wireless networks. Based on the applications executing on the M2M components, the network device may switch communication networks. Accordingly, triggers associated with the network device, may be tracked to determine whether the triggers are satisfied. For instance, an M2M component in a vehicle may be connected to a first wireless network. When the M2M component begins to stream high-definition video, the M2M component may satisfy a bandwidth trigger. The bandwidth trigger allows the M2M component to switch to a second wireless network that provides higher bandwidth capacity or transmission speeds. In one embodiment, when the bandwidth trigger is satisfied, the first network may transmit an over-the-air signal to the M2M component to switch to second wireless network. In an alternate embodiment, when the bandwidth trigger is satisfied, the M2M component may automatically switch to the second wireless network network that is configured to provide higher bandwidth capacity or transmission speeds, or the second wireless network that is optimized to handle high-definition video.

Throughout this patent, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the embodiments of the invention. The following is a list of these acronyms:

| | |
|---|---|
| AAA | Authentication, Authorization, and Accounting |
| ATM | Automated Teller Machine |
| BTS | Base Transceiver Station |
| CDMA | Code Division Multiple Access |
| GPRS | General Packet Radio Service |
| GSM | Global System for Mobile communications (Groupe Spécial Mobile) |
| IP | Internet Protocol |
| IPv4 | Internet Protocol Version Four |
| IPv6 | Internet Protocol Version Six |
| LED | Light Emitting Diode |
| M2M | Machine-to-Machine |
| PDA | Personal Data Assistant |
| RNC | Radio Network Controller |
| TDMA | Time Division Multiple Access |
| UMTS | Universal Mobile Telecommunications System |
| Wi-Fi | Wireless Fidelity |
| WiMAX | Worldwide Interoperability for Microwave Access |

Embodiments of the invention can take the form of a method, sever, network device, system, or computer-readable media embodied with a specific set of computer-executable instructions. Computer-readable media include both volatile and nonvolatile media, removable and nonremovable media, and contemplate media readable by a database, a switch, and various other network and computing devices. Computer-readable media include communication media and computer storage media implemented in any method or technology that stores information. Examples of stored information include computer-useable instructions, data structures, program components, and other data representations. Examples of computer-readable media include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

In one embodiment, the network device is configured with several input and output components. Additionally, an M2M component may be installed in the network device. The M2M component may include applications for communicating with different networks. The M2M component may utilize the input and output component of the network device to implement operations requested by the applications of the M2M component. The M2M component may allow a user to switch between communication networks maintained by disparate carriers. The network device having the M2M component is also configured to dynamically re-provision itself based on triggers, e.g., network availability, service availability, etc. Thus, the network device may retain access to certain specialized applications that are available only to non-roaming, homed, network devices.

FIG. 1 depicts an illustrative device suitable for use in connection with embodiments of the invention. Turning now to FIG. 1, a block diagram of an illustrative network device is provided and referenced generally by numeral 100. Although some components are shown in the singular, they may be plural. For example, network device 100 might include multiple processors or multiple radios, etc. A network device 100 may be one of many devices, including, but not limited to, a wireless phone, vending machine, video and image capture device, a laptop, a PDA, a handheld device, smart meters, vehicle tracking components, e-books, ATMs, consumer electronics, etc. As illustratively shown, network device 100 includes a bus 110 that directly or indirectly couples various components together including memory 112, a processor 114, a presentation component 116, a radio 117, input/output ports 118, input/output components 120, and a power supply 122.

We previously have described various memory components that memory 112 might take the form of. Memory component 112 can include any type of medium that is capable of storing information (e.g., a database 112A). The database 112A may be configured to store provisioning credentials, triggers associated with network device, and activity associated with the triggers. The database 112A may also store applications associated with a M2M component installed on the network device 100. Processor 114 might actually be multiple processors that receive instructions associated with the applications and process the instructions accordingly. Presentation component 116 includes the likes of a display, a speaker, as well as other components that can present information (such as a lamp (LED), or even lighted keyboards).

The M2M component utilizes the communication interfaces of network device 100 to receive data from network resources on the communication network. In an embodiment, an application on the M2M component monitors various triggers, including, but not limited to, location, time of day, day of week, bandwidth, data transmission speeds, network device velocity, etc. The triggers may specify thresholds. Once a threshold is satisfied, the M2M component may select network credentials for another communication network. In turn, the network device 100 switches communication networks based on the selected network credentials. In certain embodiments, the triggers and network credentials may be stored locally on the database 112A. And the M2M component may access database 112A to obtain the thresholds associated with the triggers. In turn, the M2M component determine whether the trigger is satisfied. The database 112A is also accessed to select credentials for a another communication network based on the satisfied triggers. In another embodiment, the M2M component receives a notification from a remote server on a communication network that the network device is currently connected to. The remote server may monitor the trigger conditions associated with the network device 100. In turn, when the triggers are satisfied, the remote server may send a notification to the network device 100. In turn, the network device 100 may obtain credentials stored locally on database 112A. Alternatively, the network sends a request to an external database to obtain credential information for another communication network. The credentials are obtained by the network device 100. The network device utilizes the obtained credentials to switch to the other communication network.

In some embodiments, the network resources on the communication network may be a server, a database, or an authorization component that provides the network device 100 with an indication of whether the triggers are satisfied. The communication interface may be a radio 117 that facilitates communication with a wireless telecommunications network. Illustrative wireless telecommunications technologies include CDMA, GPRS, TDMA, GSM, WIMAX, LTE, UMTS, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into network device 100. Power supply 122 includes items such as batteries, fuel cells, or any other component that can act as a power source to power network device 100.

Accordingly, a network device 100 may switch between various networks based on the triggers specified for the various networks. The network device switches between the various networks automatically based on provisioning credentials. The provisioning credentials may be stored locally on the network device or remotely by a provisioning system. It will be understood and appreciated by those of ordinary skill in the art that the network device 100 shown in FIG. 1 is merely an example of one suitable network device 100 and is not intended to suggest any limitation as to the scope of use or functionality of the embodiments of the invention. Neither should the network device 100 be interpreted as having any dependency or requirement related to any single component or combination of components illustrated therein. The single unit depictions are meant for clarity, not to limit the scope of embodiments in any form.

A network device may have slot 1 associated with a first network. The slot 1 provisioning credentials may be changed dynamically based on triggers associated with the network device. In some embodiment, the provisioning credentials may be provided by a provisioning system. In turn, the network device switches to a second network when the triggers are satisfied. The second network is associated with the changed provisional credentials stored in slot 1 of the network device.

Figure 2:
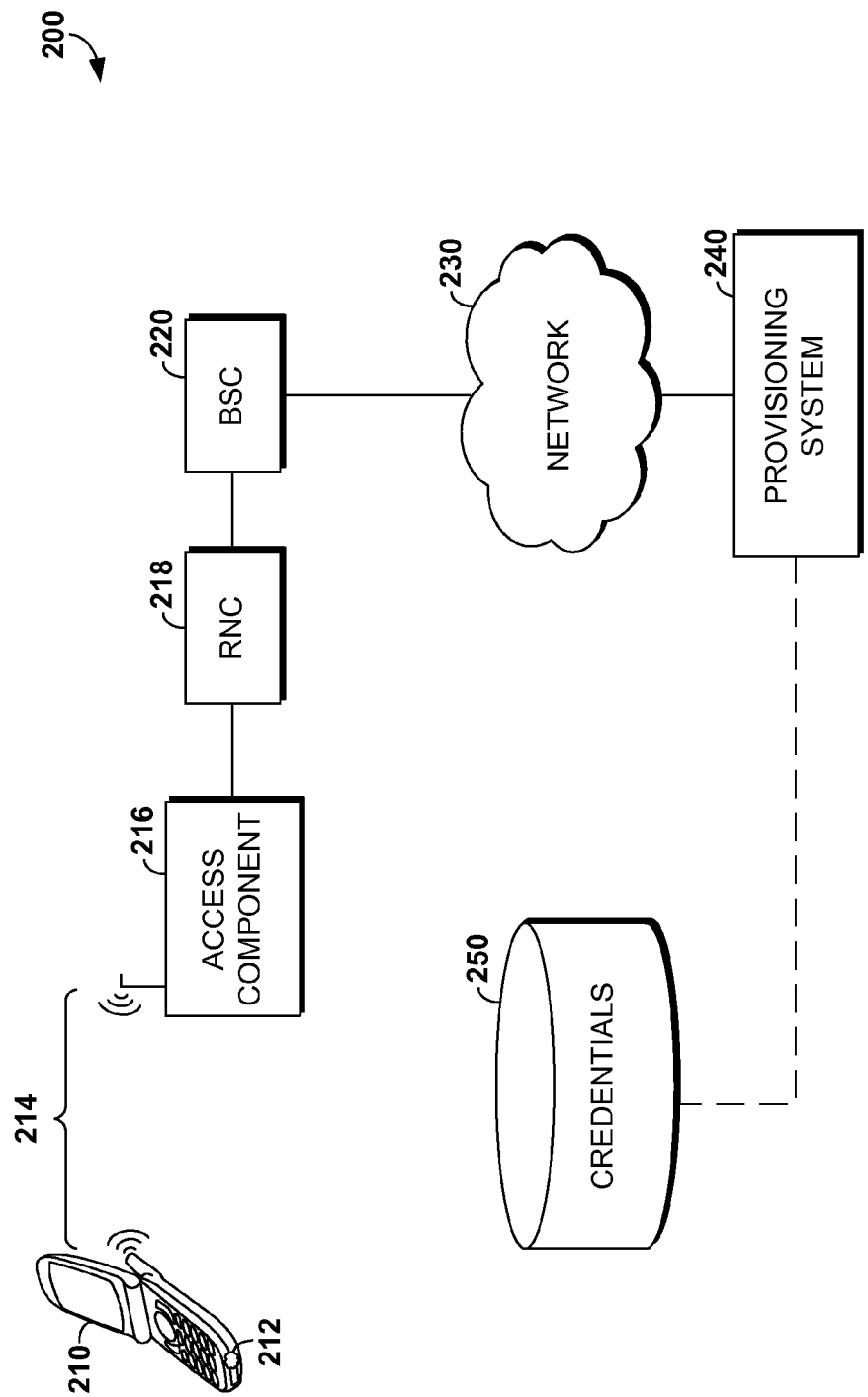
FIG. 2 depicts an illustrative computing system suitable for practicing embodiments of the invention.

FIG. 2 depicts an illustrative computing system suitable for practicing embodiments of the invention. Turning now to FIG. 2, an illustrative computing system is provided and referenced generally by the numeral 200, which depicts an illustrative operating environment for re-provisioning the network device. The computing system 200 may include a network device 210, access components 216, RNC 218, BSC 220, network 230, provisioning system 240, and credential database 250.

Network device 210 executes a M2M application 212 that automatically re-provisions the network device 210. In one embodiment, the M2M application 212 monitors the triggers to determine whether one or more triggers are satisfied. In turn, the M2M application 212 may select additional provisioning credentials from storage on the network device 210 when one or more triggers are satisfied. The M2M application 212 may, in other embodiments, utilize provisioning credentials received from the provisioning system 240.

Network device 210 communicates with an access component 216 by way of a communication link 214. Communications link 214 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi connection to a device (e.g., wireless hotspot) that provides access to a wireless communications network, such as a WLAN connection using 802.11 protocol. A long-range connection may include a connection using one or more of CDMA, GPRS, GSM, TDMA, and 802.16.

Generally, the access component 216 provides access to what some skilled artisans refer to as a wireless communications network 230. The access component 216 may be one or more of a base transceiver station (BTS) tower, a Wi-Fi Router, and any other device that facilitates communication between network device 210 and network 230. In one embodiment, the access component 216 includes both a Wi-Fi Router and a BTS tower. In another embodiment, access component 216 is a BTS tower. A radio network controller (RNC) 218 performs various functions, such as managing radio channels, power control, load control, admission control, packet scheduling, handover control, macrodiversity, security functions, and mobility management. A base station controller (BSC) 220 is also shown in FIG. 2. The BSC 220 acts as the intelligence behind base transceiver stations (BTS) (not shown), and handles allocation of radio channels, receives measurements from network devices 210, and controls handovers from one BTS to another BTS.

The components illustrated in FIG. 2, such as those that may be included in a wireless communications network 230 include a credential database 250 and a provisioning system 240. The provisioning system 240 may, in certain embodiments, provide the network device 210 with access to the credential database 250. In some embodiments, the provisioning system 240 may also include, or access, a monitor component that generates notifications when triggers associated with the network device 210 are satisfied.

The credential database 250 stores provisioning credentials for various communication networks from different network providers. The provisioning credentials may include network identifiers and device identifiers. For instance, the provisioning credentials may include device@carrier1.com, device@carrier2.com, etc. The provisioning credentials, in one embodiment, are utilized to identify the device and may impact the type of network the that the network device 210 connects to. In some embodiments, the communication networks may be optimized for specific types of network devices or communications from the network devices. For instance, the communication networks may be optimized for high-definition content, fast moving network devices, slow moving network devices, network devices in Europe, network devices in America, network device in Canada, etc. The provisioning credentials provides access to the communication networks. The network device 210 having the provisioning credentials is treated as a home network device. Thus, the network device may have access to network applications provided by the communication network associated with the provisioning credentials selected for the network device 210 based on one or more of the satisfied triggers. In some embodiments, the credential database 250 may be stored locally on the network device 210. In other embodiments, the credential database 250 is a remote network resource that is accessible via the communication network 230. Accordingly, the credential database 250 may be utilized to obtain provisioning credentials for the network device 210. In other embodiments, the credential database 250 is used to store various attributes associated with network devices 210, such as IP addresses. Generally, an IP address is a numerical label that is assigned to devices in a network that use the Internet Protocol for communication between its attached devices. An IP address identifies the host and network interface and location addressing. In embodiments of the invention, an IP version four (IPv4) or IP version six (IPv6) address is allocated to a network device 210.

The monitor component is a tracking component of the provisioning system 240. The monitor component may track thresholds associated with the triggers to determine whether a trigger is satisfied. When the trigger is satisfied, the monitor component transmits a notification to the network device. The network device may then switch networks based on the satisfied triggers. The notification may identify the triggers that are satisfied based on the tracking information gathered by the monitor component. In some embodiments, the monitor component may transmit the notification to the provisioning system 240. In turn, the provisioning system identifies provisioning credentials associated with another communication network that is optimized to handle the communications associated with the network device 210. The selected provisioning credentials are transferred to the network device 210. The network device update the credentials with the selected provisioning credentials. The network device, also, connects to the communication network corresponding to the selected provisioning credentials and disconnects from the previous communication network.

Generally, in this disclosure, when we speak of transmitting data or information we are referring to any action that requires network device 210 to have an IP address in order to carry out some action. Network device 210 might attempt to access items such as the Internet as well as other network resources that might alone or in combination facilitate things such as, paying bills, viewing account activity, television reception, e-mail reception, picture mail, video mail, video conferencing, shopping, and the like.

For instance, a network device 210 may initiate a call when the user is driving a car from America to Canada. The network device 210 or monitoring component may determine that the network device 210 will enter Canada in 20 minutes based on current network device speed. The network device 210 may satisfy trigger conditions associate with speed and location. The speed trigger may be satisfied because the user is traveling at over 48 kilometers per hour. The location trigger may be satisfied because the user is less than 16 kilometers from the border of Canada. The network device 210 may utilize these triggers to identify credentials for communication networks in Canada. The identified credentials may be obtained by the network device 210. The network device 210 may switch to a communication network in Canada based on the obtained credentials and disconnect from the previous communication network.

The illustrated elements of computing system 200 are meant to be exemplary in nature, and the various lower-level details of the elements are not elaborated on so as to not obscure the embodiments of the invention. Clearly, some of the elements may be absent in some embodiments of the invention, and additional elements not shown may also be part of computing system 200. Attempting to show all of the various elements of computing system 200 would obscure certain novel aspects, and we will refrain from such elaboration at least for the sake of brevity.

In one embodiment, the network device may switch communication networks to prevent roaming. The network device may be configured with credentials that are utilized to switch communication networks when one or more triggers are satisfied. If the network device does not have a credential for another communication network, the network device may request provisioning credential from a provisioning system.

Figure 3:
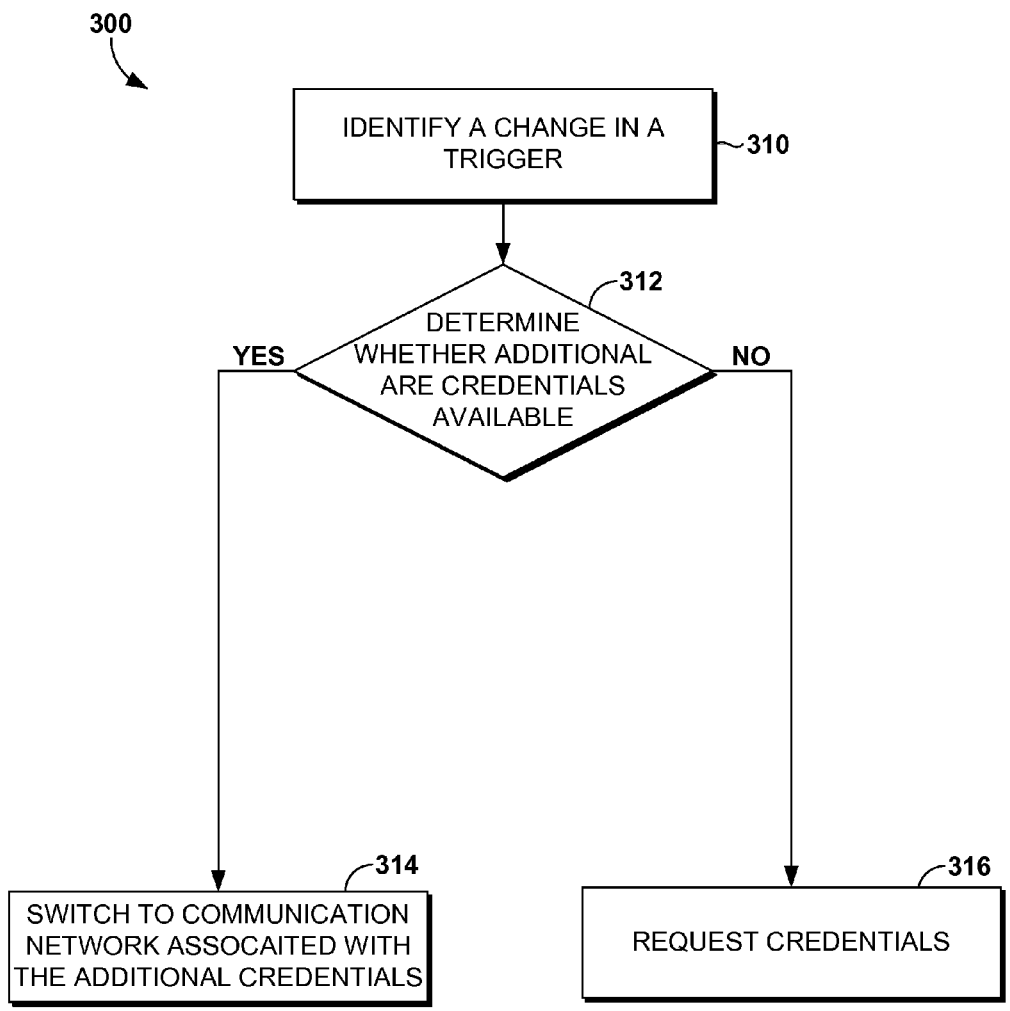
FIG. 3 depicts a flow diagram illustrating a method for re-provisioning a network device in accordance with embodiments of the invention.

FIG. 3 depicts a flow diagram 300 illustrating a method for re-provisioning a network device in accordance with embodiments of the invention. In step 310, the network device may identify a change in a trigger that requires automatic re-provisioning of the network device. The trigger may be any one of a: a time of day associated with the network device, battery power remaining for the network device, location associated with the network device, speed associated with the network device.

In step 312, the network device determines whether additional network provisioning credentials are available for the network device. If the additional network provisioning credentials are available on the network device, in step 314, the network device switches to the communication network associated with the additional provisioning credentials. In some embodiments, the network device changes a network identifier associated with the network device when the trigger condition is satisfied. The network provisioning credentials in slot 1 of the network device may be replaced with the additional network provisioning credentials.

Alternatively, if the additional network provisioning credentials are not available, in step 316, the network device requests network provisioning credentials. The requested network provisioning credentials may be received over the air from a provisioning system. The requested network provisioning credentials allow the network device to be homed to the other communication network.

In yet another embodiment, the network device is also configured to switch between communication networks. The network device may switch to communication networks that are optimized to carry the transmissions generated by the network device. The communication networks may be switched in response to notifications received at the network device or a provisioning system.

Figure 4:
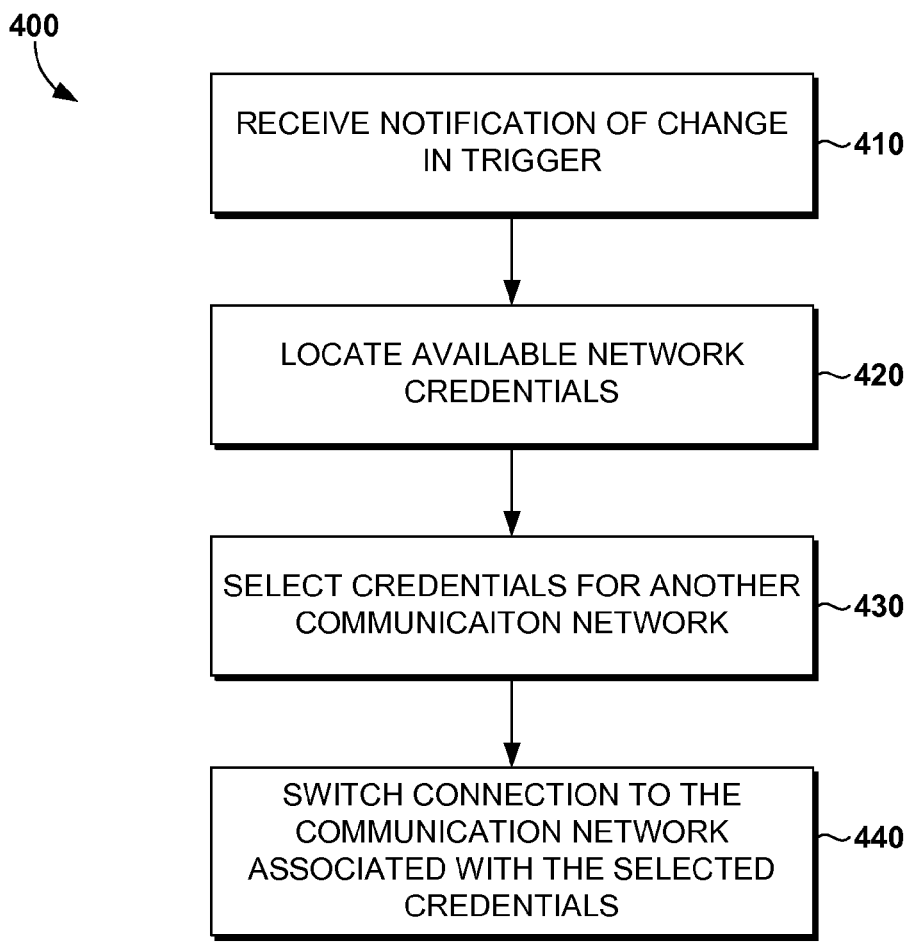
FIG. 4 depicts a flow diagram illustrating a method for switching communication networks in accordance with embodiments of the invention.

FIG. 4 depicts a flow diagram 400 illustrating a method for switching communication networks in accordance with embodiments of the invention. The method may be executed locally by the network device. The network device is one of a: vending machine, a media player, an image capturing device, or a wireless device. In step 410, the network device receives a notifications that the triggers changed. The notifications may be transmitted from a monitoring component when a threshold associated with the triggers are satisfied.

In turn, in step 420, the network device locates available network credentials. The network credentials may be utilized to connect to other communication network that are optimized for transmissions currently associated with the network device. In step 430, the network device selects provisioning credentials for the other communication network.

In step 440, the network device switches to the other communication network associated with the selected credentials. The network device may, also, disconnect from the previous communication network. The selected credential allows the user be seen, and treated, as homed to the other communication network. Thus, the user is able to transmit messages over the other communication network without roaming.

In summary, a M2M component on the network device or a network server may allow a network device to re-provision itself. The provisioning credentials for other communication network are accessed based on triggers. When the triggers are satisfied, the network device connects to the other communication networks that are optimized for the communications currently associated with the network device. The network device is homed to the other communication network and does not roam while connected to the other communication network. Thus, applications that would be unavailable to roaming network devices are available to the network device.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer implemented method for re-provisioning a network device, the method comprising:
    in a network provisioning system, identifying when a re-provisioning trigger condition comprising a time of day is satisfied for the network device that requires re-provisioning of the network device;
    in the network provisioning system, responsive to the re-provisioning trigger condition being satisfied, transferring a re-provisioning notification identifying at least the re-provisioning trigger condition for delivery to the network device;
    in the network device, responsive to the re-provisioning notification, determining whether additional network provisioning credentials related to the re-provisioning trigger condition are available on the network device;
    in the network device, if the additional network provisioning credentials are available on the network device, changing a network identifier associated with the network device using the additional network provisioning credentials related to the re-provisioning trigger condition; and
    in the network device, if the additional network provisioning credentials are not available on the network device, requesting the additional network provisioning credentials from the network provisioning system.

2. The method of claim 1, wherein the re-provisioning trigger condition further comprises battery power remaining for the network device.

3. The method of claim 1, wherein the re-provisioning trigger condition further comprises a location associated with the network device.

4. The method of claim 1, wherein the re-provisioning trigger condition further comprises a speed associated with the network device.

5. The method of claim 1, wherein the network credential in slot 1 of the network device are replaced with the additional network provisioning credentials.

6. The method of claim 1, wherein the additional network provisioning credentials are received over the air.

7. One or more computer-readable storage devices storing computer-useable instructions to perform a computer-implemented method for re-provisioning a network device, the method comprising:
- in a network provisioning system, identifying when a re-provisioning trigger condition comprising battery power remaining for the network device is satisfied for the network device that requires re-provisioning of the network device;
- in the network provisioning system, responsive to the re-provisioning trigger condition being satisfied, transferring a re-provisioning notification identifying at least the re-provisioning trigger condition for delivery to the network device;
- in the network device, responsive to the re-provisioning notification, determining whether additional network provisioning credentials related to the re-provisioning trigger condition are available on the network device;
- in the network device, if the additional network provisioning credentials are available on the network device, changing a network identifier associated with the network device using the additional network provisioning credentials related to the re-provisioning trigger condition; and
- in the network device, if the additional network provisioning credentials are not available on the network device, requesting the additional network provisioning credentials from the network provisioning system.

8. The one or more computer-readable storage devices of claim 7, wherein the re-provisioning trigger condition further comprises a time of day associated with the network device.

9. The one or more computer-readable storage devices of claim 7, wherein the re-provisioning trigger condition further comprises a location associated with the network device.

10. The one or more computer-readable storage devices of claim 7, wherein the re-provisioning trigger condition further comprises a speed associated with the network device.

11. The one or more computer-readable storage devices of claim 7, wherein the network credential in slot 1 of the network device are replaced with the additional network provisioning credentials.

12. The one or more computer-readable storage devices of claim 7, wherein the additional network provisioning credentials are received over the air.

13. A communication system for re-provisioning a network device, the communication system comprising:
- a network provisioning system that identifies when a re-provisioning trigger condition comprising a battery power remaining for the network device is satisfied for the network device that requires re-provisioning of the network device and responsive to the re-provisioning trigger condition being satisfied, transfers a re-provisioning notification identifying at least the re-provisioning trigger condition for delivery to the network device;
- the network device that, responsive to the re-provisioning notification, determines whether additional network provisioning credentials related to the re-provisioning trigger condition are available on the network device, changes a network identifier associated with the network device using the additional network provisioning credentials when the additional network provisioning credentials are available on the network device, and requests network provisioning credentials from the network provisioning system when the additional network provisioning credentials are not available on the network device.

14. The communication system of claim 13, wherein the re-provisioning trigger condition further comprises a speed associated with network device.

15. The communication system of claim 14, wherein the re-provisioning trigger condition comprising the speed is satisfied when the network device is moving at a velocity higher than or equal to the speed.

16. The communication system of claim 13, the network device further comprising a storage for additional provisioning credentials for various communication networks.

17. The communication system of claim 13, comprising:
- the network provisioning system receives the request for the additional provisioning credentials.

18. The communication system of claim 13, wherein the network credentials in slot 1 of the network device are replaced with the additional network provisioning credentials.

* * * * *